(12) United States Patent
Jones et al.

(10) Patent No.: US 10,179,404 B2
(45) Date of Patent: Jan. 15, 2019

(54) STOCKING TOOL

(71) Applicant: Walmart Apollo, LLC, Bentonville, AR (US)

(72) Inventors: Matthew Allen Jones, Bentonville, AR (US); Nicholaus Adam Jones, Fayetteville, AR (US); Aaron James Vasgaard, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/841,400

(22) Filed: Dec. 14, 2017

(65) Prior Publication Data

US 2018/0161977 A1 Jun. 14, 2018

Related U.S. Application Data

(60) Provisional application No. 62/433,979, filed on Dec. 14, 2016, provisional application No. 62/433,984, filed on Dec. 14, 2016.

(51) Int. Cl.
*A47F 13/08* (2006.01)
*B25J 1/04* (2006.01)

(52) U.S. Cl.
CPC ............... *B25J 1/04* (2013.01); *A47F 13/08* (2013.01)

(58) Field of Classification Search
CPC ..... B25J 1/04; A47F 1/12; A47F 1/125; A47F 5/0043; A47F 5/005; A47F 13/06; A47F 13/08
USPC ............................ 294/15, 22; 211/59.2, 59.3
See application file for complete search history.

(56) References Cited

U.S. PATENT DOCUMENTS

| 747,376 | A | * | 12/1903 | Christman | |
| 2,762,647 | A | * | 9/1956 | Guest | B25J 1/04 |
| | | | | | 294/103.1 |
| 4,962,957 | A | * | 10/1990 | Traber | B25J 1/04 |
| | | | | | 294/100 |
| 5,469,976 | A | | 11/1995 | Burchell | |
| 5,803,276 | A | * | 9/1998 | Vogler | A47F 5/005 |
| | | | | | 108/60 |
| 6,502,875 | B1 | | 1/2003 | Berry | |
| 6,719,151 | B2 | | 4/2004 | Close | |
| 7,458,473 | B1 | * | 12/2008 | Mason | A47F 1/126 |
| | | | | | 211/175 |
| 7,992,726 | B2 | | 8/2011 | Goehring | |
| 8,727,405 | B2 | * | 5/2014 | Cameron | B25J 1/00 |
| | | | | | 294/16 |

(Continued)

*Primary Examiner* — Dean J Kramer
(74) *Attorney, Agent, or Firm* — Schmeiser, Olsen & Watts LLP

(57) ABSTRACT

Provided is a stocking tool. The stocking tool includes a first adjustable rigid side member, a second adjustable rigid side member, and a handle operatively coupled to the first adjustable rigid side member and the second adjustable rigid side member. The first adjustable rigid side member and the second adjustable rigid side member move toward and away from each other to adjust a width defined between the first and second adjustable rigid side members. The handle is moveable between a locked position with the handle activating a locking device and an unlocked position with the handle deactivating the locking device. The width defined between the first and second adjustable rigid side members receives product on the shelf and the first and second adjustable rigid side members align the received product on the shelf.

17 Claims, 13 Drawing Sheets

(56) References Cited

U.S. PATENT DOCUMENTS

| | | |
|---|---|---|
| 9,398,817 B2 | 7/2016 | Daw |
| 2009/0261607 A1 | 10/2009 | Braver |
| 2010/0108625 A1* | 5/2010 | Meers ............... A47F 13/00 |
| | | 211/59.3 |
| 2015/0034576 A1 | 2/2015 | Wong |
| 2015/0208830 A1* | 7/2015 | Hardy ............... A47F 1/126 |
| | | 211/59.3 |
| 2016/0213172 A1 | 7/2016 | Christoffersen |

* cited by examiner

STOCKING TOOL

CROSS-REFERENCE TO RELATED APPLICATIONS

This application claims the benefit and priority of U.S. Patent Application No. 62/433,979, filed on Dec. 14, 2016 and entitled STOCKING TOOL, and U.S. Patent Application No. 62/433,984, filed on Dec. 14, 2016 and entitled ZONING TOOL, the contents of each of which are hereby incorporated by reference.

FIELD OF THE INVENTION

The invention relates generally to stocking shelves, and more specifically, to a stocking tool for stocking shelves.

BACKGROUND

Currently the stocking of product on shelves in a store, warehouse or otherwise includes a person charged with such a task to clear space on a shelf and load that space with product. Often times shelves are being stocked that are empty and person stocking must make decisions as to how much area to stock the product in and account for other products that must also be stocked on the same shelf. It can be difficult to stock a product within the predetermined amount of space allocated for that product on a shelf, particularly between other items and still keep the products accessible. It is further difficult to zone product to the front of a shelf, particularly between products on a shelf.

BRIEF SUMMARY

In one aspect, provided is a stocking tool comprising a first adjustable rigid side member; a second adjustable rigid side member; and a handle coupled to ends of the first adjustable rigid side member and the second adjustable rigid side member, wherein: the first adjustable rigid side member and the second adjustable rigid side member move toward and away from each other to adjust a width defined between the first and second adjustable rigid side members; the handle is moveable between a locked position with the handle activating a locking device and an unlocked position with the handle deactivating the locking device; and the width defined between the first and second adjustable rigid side members receives product on a shelf and the first and second adjustable rigid side members align product on the shelf.

In another aspect, provided is a method of using stocking tool, the method comprising: placing a stocking tool on a shelf at a desired location for a product to be stocked; moving a handle of the stocking tool from an unlocked position to a locked position to lock the stocking tool in place on the shelf; adjusting a width defined between first and second adjustable rigid side members, wherein the width corresponds to a size and amount of the product to be stocked on the shelf; placing the product to be stocked with the tool within the width defined between the first and second adjustable rigid side members; moving the handle of the stocking tool from the locked position to the unlocked position; and removing the stocking tool from the shelf leaving the product on the shelf.

In another aspect, provided is a stocking system comprising a shelf; and a stocking tool comprising: a first adjustable rigid side member; a second adjustable rigid side member; and a handle coupled to ends of the first adjustable rigid side member and the second adjustable rigid side member, wherein: the first adjustable rigid side member and the second adjustable rigid side member move toward and away from each other to adjust a width defined between the first and second adjustable rigid side members; the handle is moveable between a locked position with the handle activating a locking device and an unlocked position with the handle deactivating the locking device; and the width defined between the first and second adjustable rigid side members receives product on the shelf and the first and second adjustable rigid side members align the received product on the shelf.

In another aspect, provided is a zoning tool comprising a first adjustable rigid side member; a second adjustable rigid side member, wherein the first adjustable rigid side member and the second adjustable rigid side member move toward and away from each other to adjust a width defined between the first and second adjustable rigid side members to set a zone width; a handle operatively coupled to the first adjustable rigid side member and the second adjustable rigid side member, wherein the handle is moveable between a locked position with the handle activating a locking device and an unlocked position with the handle deactivating the locking device; a moveable door rotatable between an inoperable position and an operable position, wherein the moveable door is linearly moveable along the shelf; and product within the zoning tool, wherein the product is moved to the front of the shelf in response to moving the moveable door linearly along the shelf.

In another aspect, provided is a method of using zoning tool, the method comprising: placing a zoning tool on a shelf at a desired location for zoning; moving a handle of the zoning tool from an unlocked position to a locked position to lock the zoning tool in place on the shelf; adjusting a width defined between first and second adjustable rigid side members, wherein the width corresponds to a size and amount of product to be zoned on the shelf; locating the product to be zoned with the zoning tool within the width defined between the first and second adjustable rigid side members; rotating a moveable door between an inoperable position and an operable position; moving the moveable door linearly along the shelf; zoning product within the zoning tool in response to moving the moveable door linearly along the shelf; moving the handle of the zoning tool from the locked position to the unlocked position; and removing the zoning tool from the shelf leaving the product on the shelf within the desired zone without interfering with existing zones on the shelf.

In another aspect, provided is a zoning system comprising: a shelf; and a zoning tool comprising a first adjustable rigid side member; a second adjustable rigid side member, wherein the first adjustable rigid side member and the second adjustable rigid side member move toward and away from each other to adjust a width defined between the first and second adjustable rigid side members to set a zone width; a handle operatively coupled to the first adjustable rigid side member and the second adjustable rigid side member, wherein the handle is moveable between a locked position with the handle activating a locking device and an unlocked position with the handle deactivating the locking device; a moveable door rotatable between an inoperable position and an operable position, wherein the moveable door is linearly moveable along the shelf; and product within the zoning tool, wherein the product is moved to the front of the shelf in response to moving the moveable door linearly along the shelf.

BRIEF DESCRIPTION OF THE SEVERAL VIEWS OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
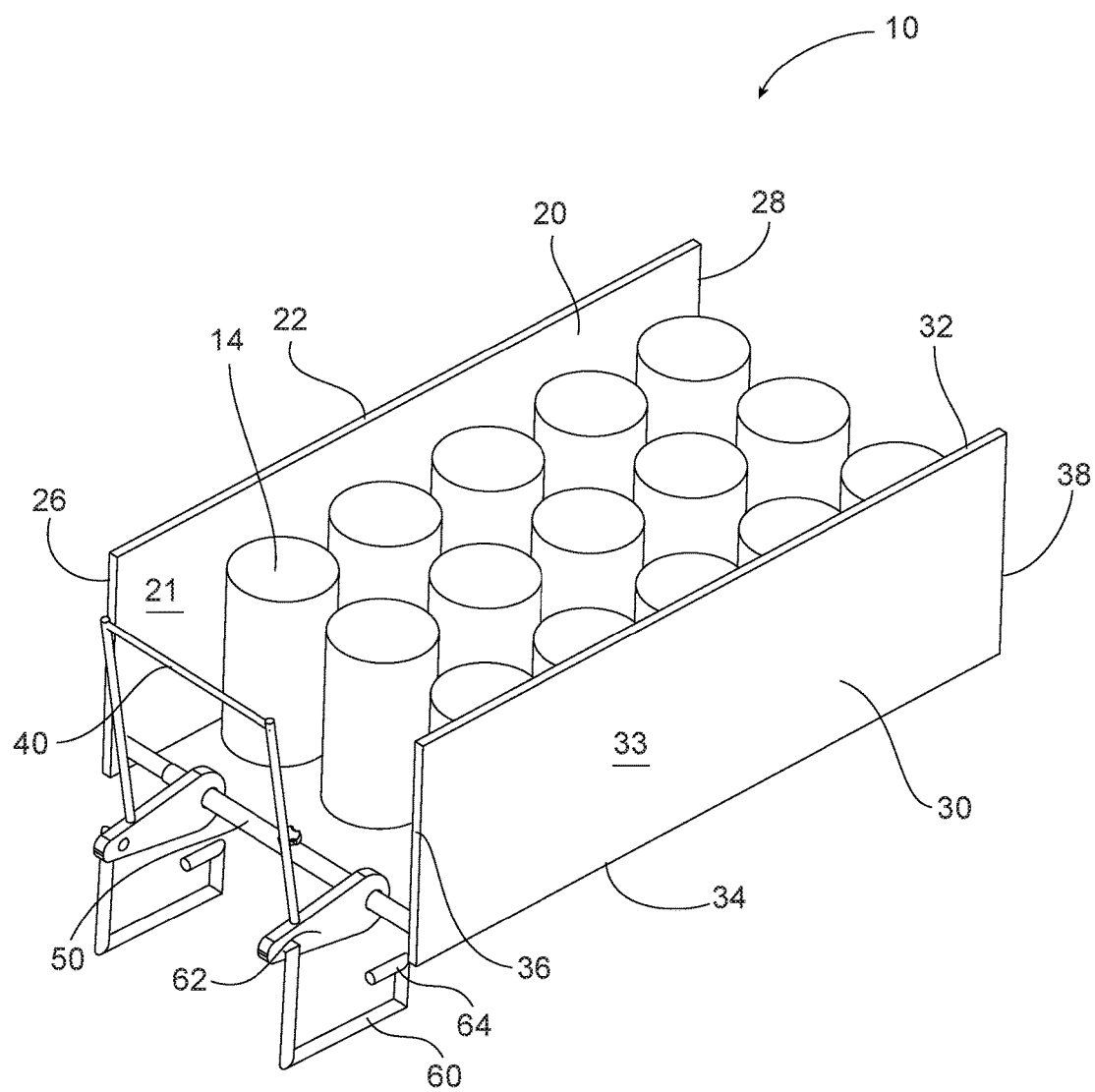
FIG. 1 is a first perspective view of a stocking tool, in accordance with some embodiments.
Figure 2:
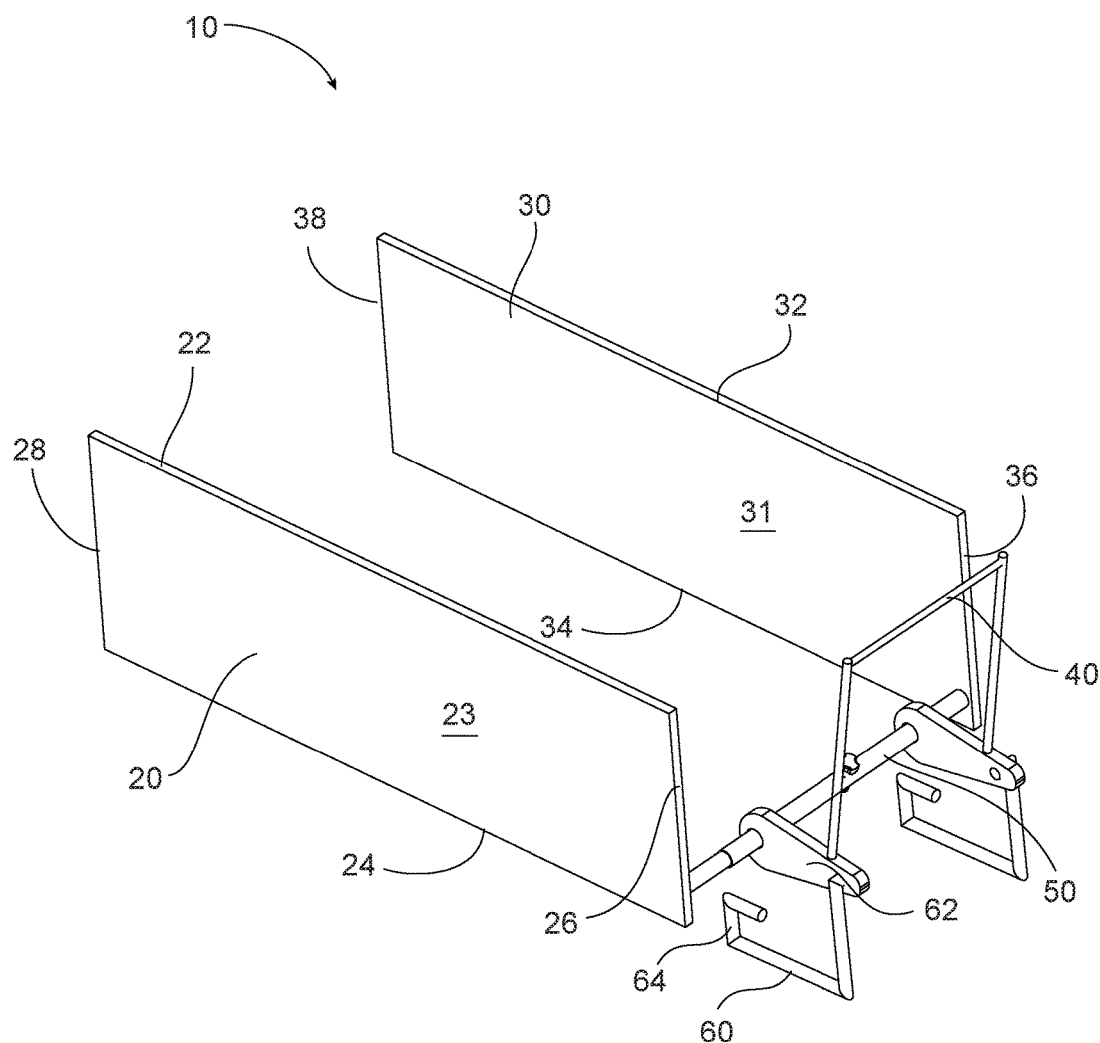
FIG. 2 is a second perspective view of a stocking tool, in accordance with some embodiments.
Figure 3:
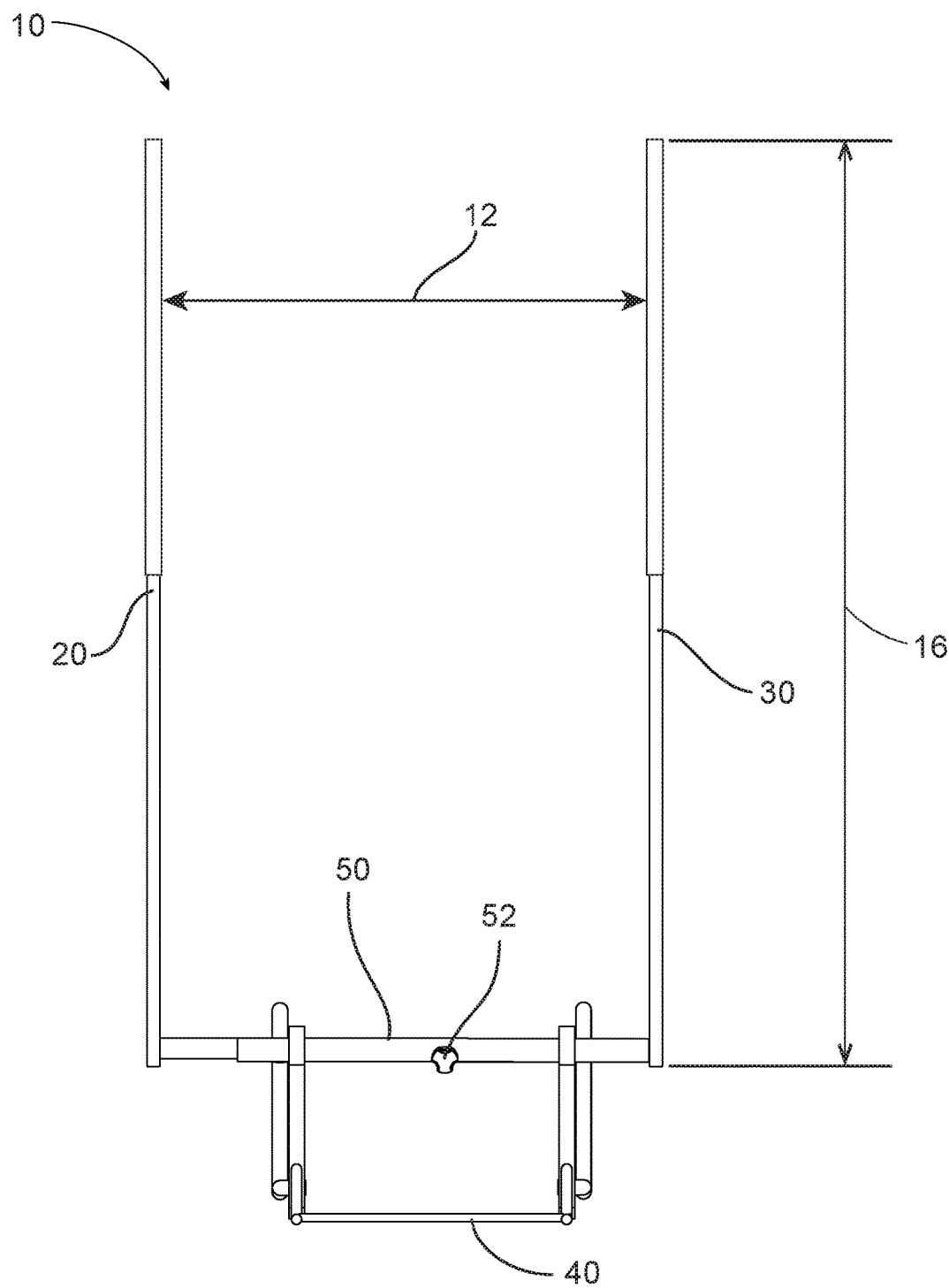
FIG. 3 is a top view of a stocking tool, in accordance with some embodiments.
Figure 4:
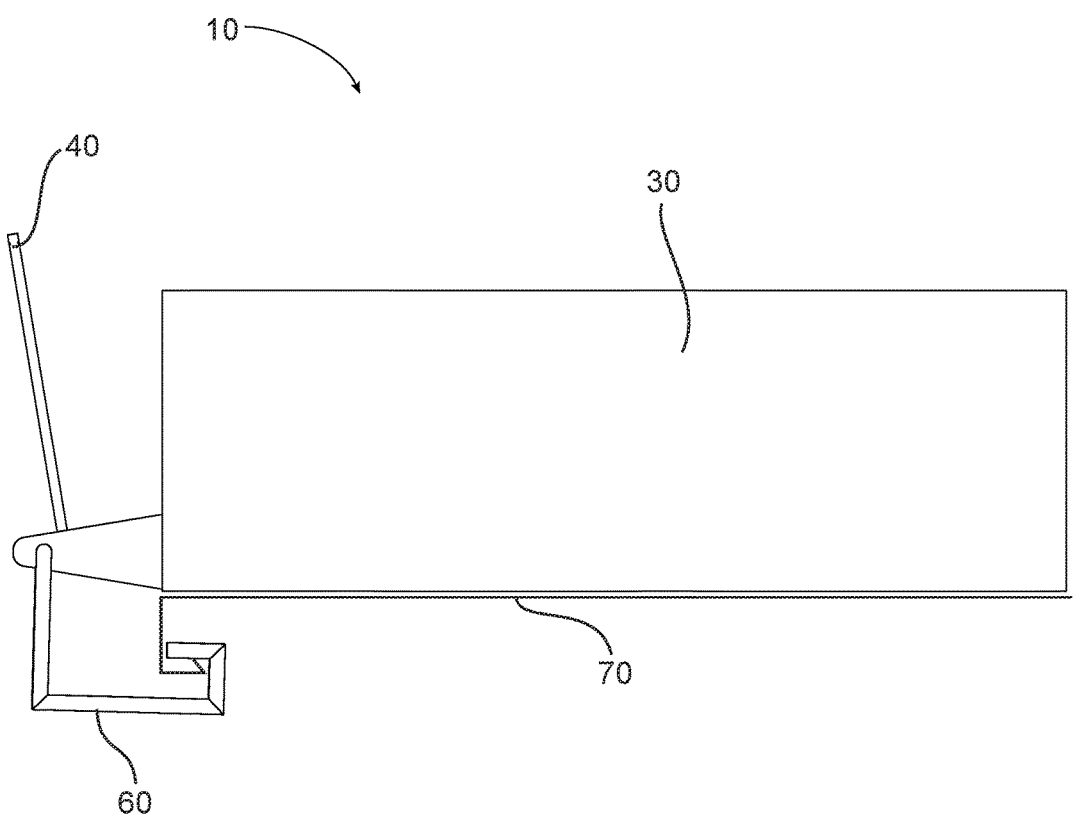
FIG. 4 is a side view of a stocking tool on a shelf, in accordance with some embodiments.

Stocking of shelves is an important aspect of operating a retail store, a grocery store, a warehouse and other business that require the stocking of shelves. The time dedicated to the stocking of shelves is valuable considering the number of persons employed by a company to do so. Further, improper stocking of shelves can result in an inefficient use of time for others as they need to move product find product or the like. Further still, shelves accessible to customers benefit from having products properly stocked and aligned on the shelves to more easily find, identify, and select desired products, including more easily identifying if a product is out of stock.

The present inventive concepts operate to allow for easy and proper stocking of shelves with product in desired locations, occupying a predetermined or desired amount of space on the shelves, and properly aligning the product on the shelves. Further, the present inventive concepts include a tool that can be used to stock with the above benefits and then the tool may be removed for further use of stocking a different product.

FIGS. 1-4 depict a stocking tool 10 according to embodiments of the present inventive concept. The stocking tool 10 may include a first adjustable rigid side member 20, a second adjustable rigid side member 30 and a handle 40. The stocking tool 10 may also include a sizing device 50 and a locking device 60. Each of these components may be assembled to form the stocking tool 10, in accordance with embodiments.

The first adjustable rigid size member 20 may include a top edge 22, a bottom edge 24, a front edge 26 and a rear edge 28. The first adjustable rigid side member 20 also includes an inner surface 21 and an outer surface 23. The second adjustable rigid size member 30 may include a top edge 32, a bottom edge 34, a front edge 36 and a rear edge 38. The second adjustable rigid side member also includes an inner surface 31 and an outer surface 33. The first adjustable rigid side member 20 and the second adjustable rigid side member 30 may be operatively coupled together wherein the inner surface 21 of the first adjustable rigid side member 20 is facing the inner surface 31 of the second adjustable rigid side member 30. Further, the first and second adjustable rigid side members 20 and 30 are oriented such that the top edge 22, the bottom edge 24, the front edge 26 and the rear edge 28 of the first adjustable rigid side member 20 are respectively aligned and substantially parallel with the top edge 32, the bottom edge 34, the front edge 36 and the rear edge 38 of the second adjustable rigid side member 30. In operation, the bottom edge 24 of first adjustable rigid side member 20 and the bottom edge 34 of the second adjustable rigid side member 30 rest on the shelf 70.

In embodiments, the first adjustable rigid side member 20 operatively coupled to second adjustable rigid side member 30 means that the first adjustable rigid side member 20 and the second adjustable rigid side member 30 are moveable toward and away from each other to adjust a width 12 defined between the inner surface 21 of the first adjustable rigid side member 20 and the inner surface 31 of the second adjustable rigid side member 30. One way that the first adjustable rigid side member 20 is operatively coupled to the second adjustable rigid side member 30 is with the sizing device 50. The sizing device 50 may be coupled between the inner surface 21 and the inner surface 31. In some embodiments, the sizing device 50 may be telescoping rods to linearly adjust the width 12 between the first adjustable rigid side member 20 and the second adjustable rigid side member 30. The sizing device 50 may be located such that it does not interfere with a shelf that the stocking tool 10 will be used with for stocking product 14. The width 12 receives product 14 within the width between the first and second adjustable rigid side members 20 and 30 and rests on the shelf 70 and the first and second adjustable rigid side members 20 and 30 align the product within the stocking tool 10.

The sizing device 50 may also include a locking mechanism 52. The locking mechanism 52 operated to lock the sizing device at a predetermined size to establish the width 12 between the first and second adjustable rigid side members 20 and 30. For example, and without limitation, in the embodiment shown, wherein the sizing device 50 is telescoping rods, the locking mechanism 52 may be a rotatable screw lock to hold the telescoping rods in a fixed position, thereby locking the width 12 at a desired measurement. The width 12 defined between the first and second adjustable rigid side members is maintained through the entire length and height of the first and second adjustable rigid side members 20 and 30.

In embodiments, the first and second adjustable rigid side members 20 and 30 may include a length 16. The length 16 may be adjustable in order to account for different shelf depths. The length 16 may be adjustable in different ways. For example and without limitation, the first and second adjustable rigid side members 20 and 30 may each include two plates that slide next to each other to adjust the length 16, or the first and second adjustable rigid side members 20 and 30 may each include a plate nested within the original side member, wherein the nested plate may slide out of and into the original side member to adjust the length 16 of the first and second adjustable rigid side members 20 and 30.

In embodiments, the handle 40 is operatively coupled to the first adjustable rigid side member 20 and the second adjustable rigid side member 30. The handle 40 is moveable between a locked position with the handle 40 activating the locking device 60 and an unlocked position with the handle 40 deactivating the locking device 60. In some embodiments, the handle 40 is rotatable. In these embodiments, the handle 40 being moveable between the locked position and the unlocked position comprises the handle 40 being rotatable between the locked position with the handle 40 activating the locking device 60 to engage with the shelf 70 and the unlocked position with the handle 40 deactivating the locking device 60 to disengage from the shelf 70. In some embodiments, as shown in the figures, the locking device includes a cam 62 and a locking member 64, wherein the handle 40 rotates about the cam axis and moves the locking member 64 to engage or disengage the shelf 70.

In some embodiments, a stocking system may include a shelf 70 and a stocking tool 10 as described above. The system allows for stocking of the shelf 70 with product 10 and to locate product 14 within a defined area on the shelf 70.

Figure 5:
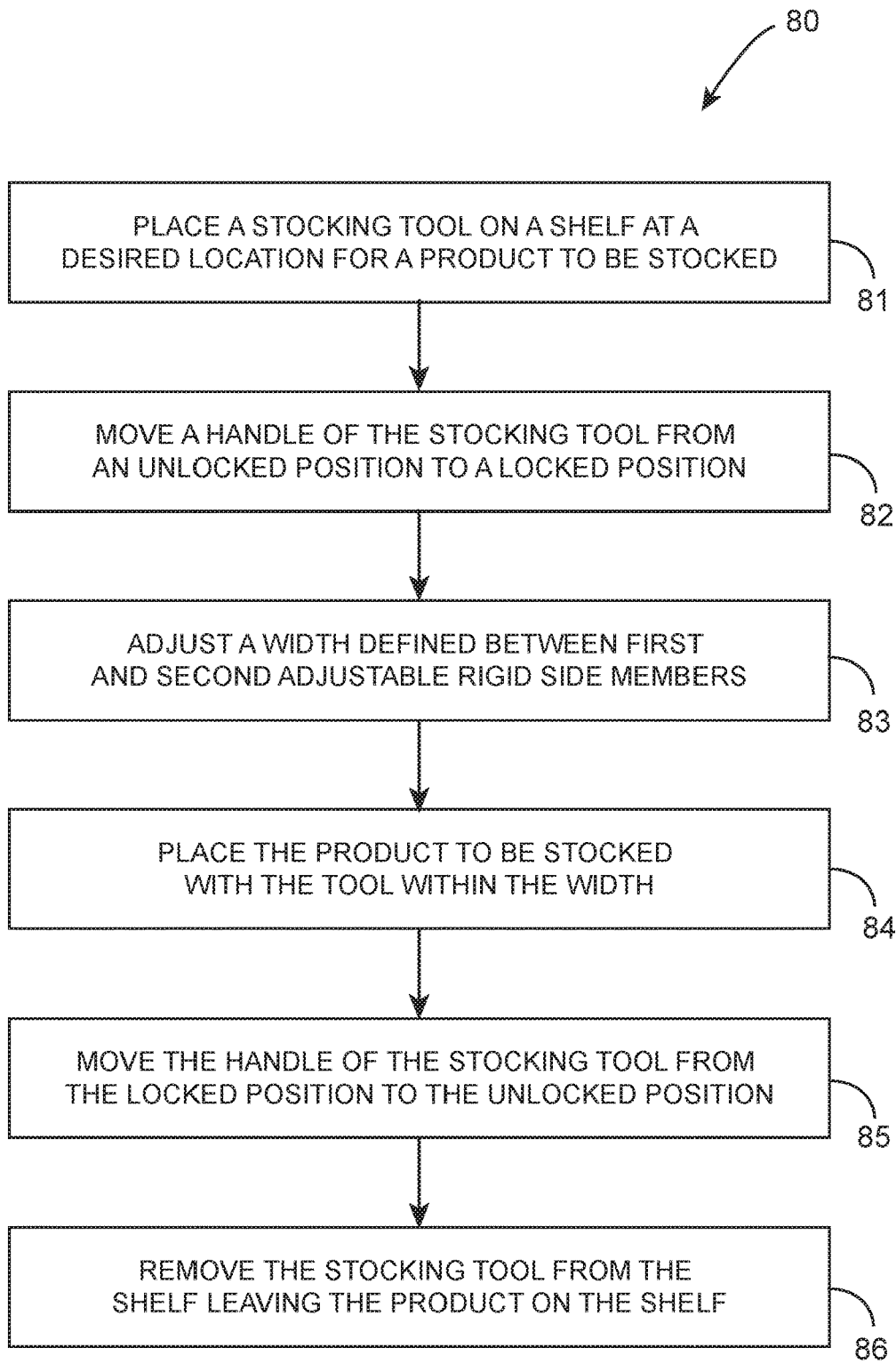
FIG. 5 is a flow diagram illustrating a method using a stocking tool, in accordance with some embodiments.
Figure 6:
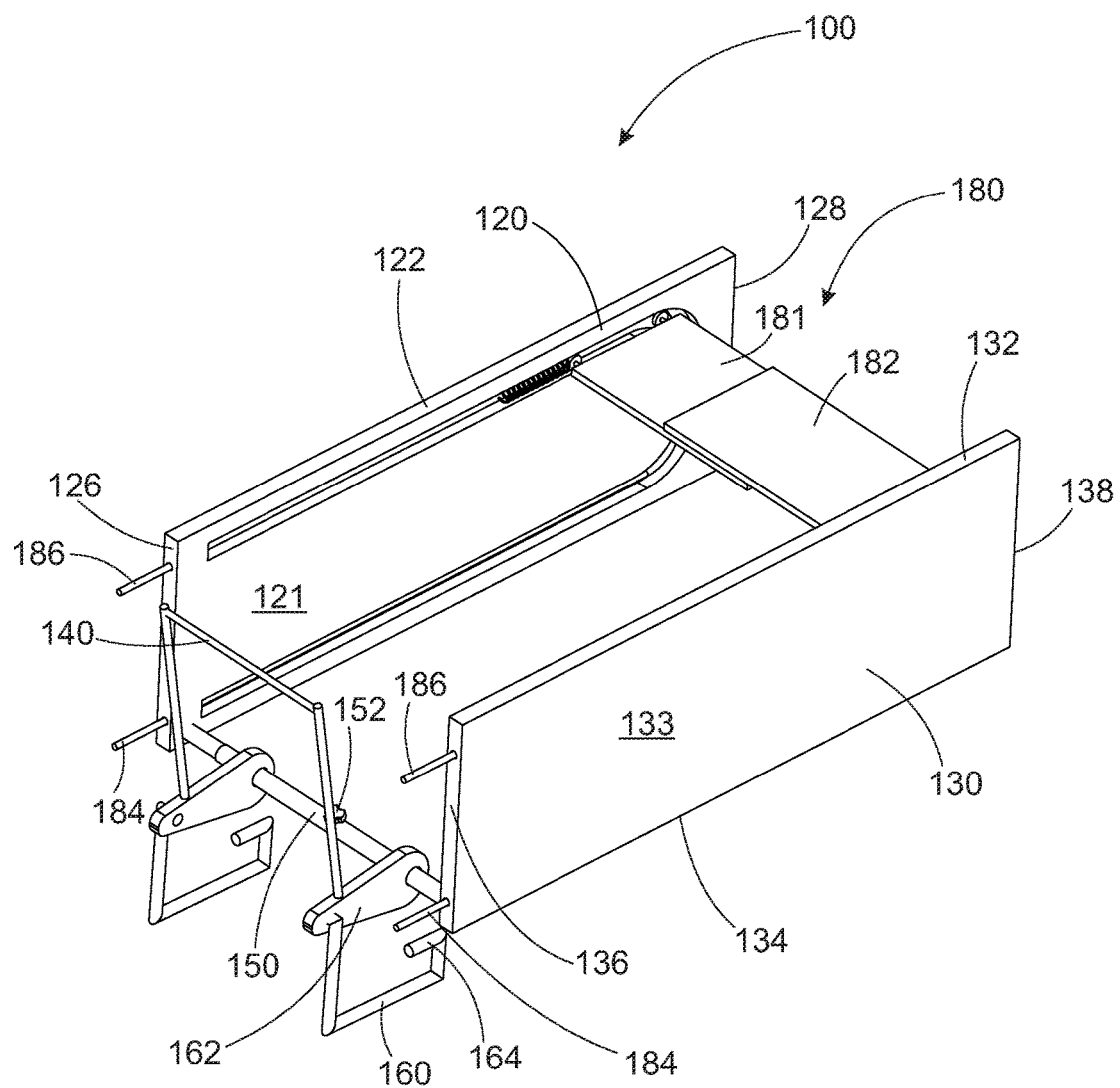
FIG. 6 is a first perspective view of a zoning tool, in accordance with some embodiments.
Figure 7:
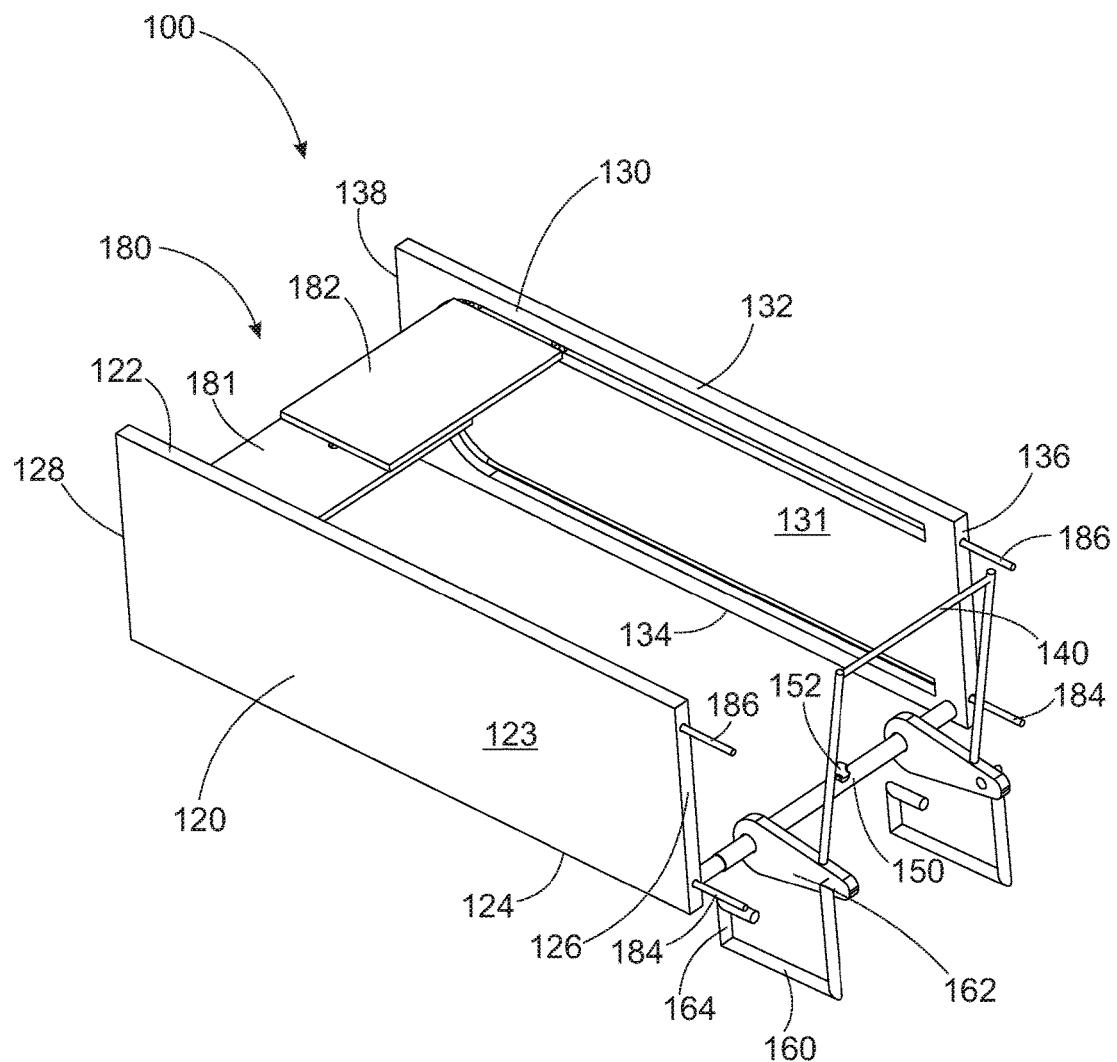
FIG. 7 is a second perspective view of the zoning tool of FIG. 6.
Figure 8:
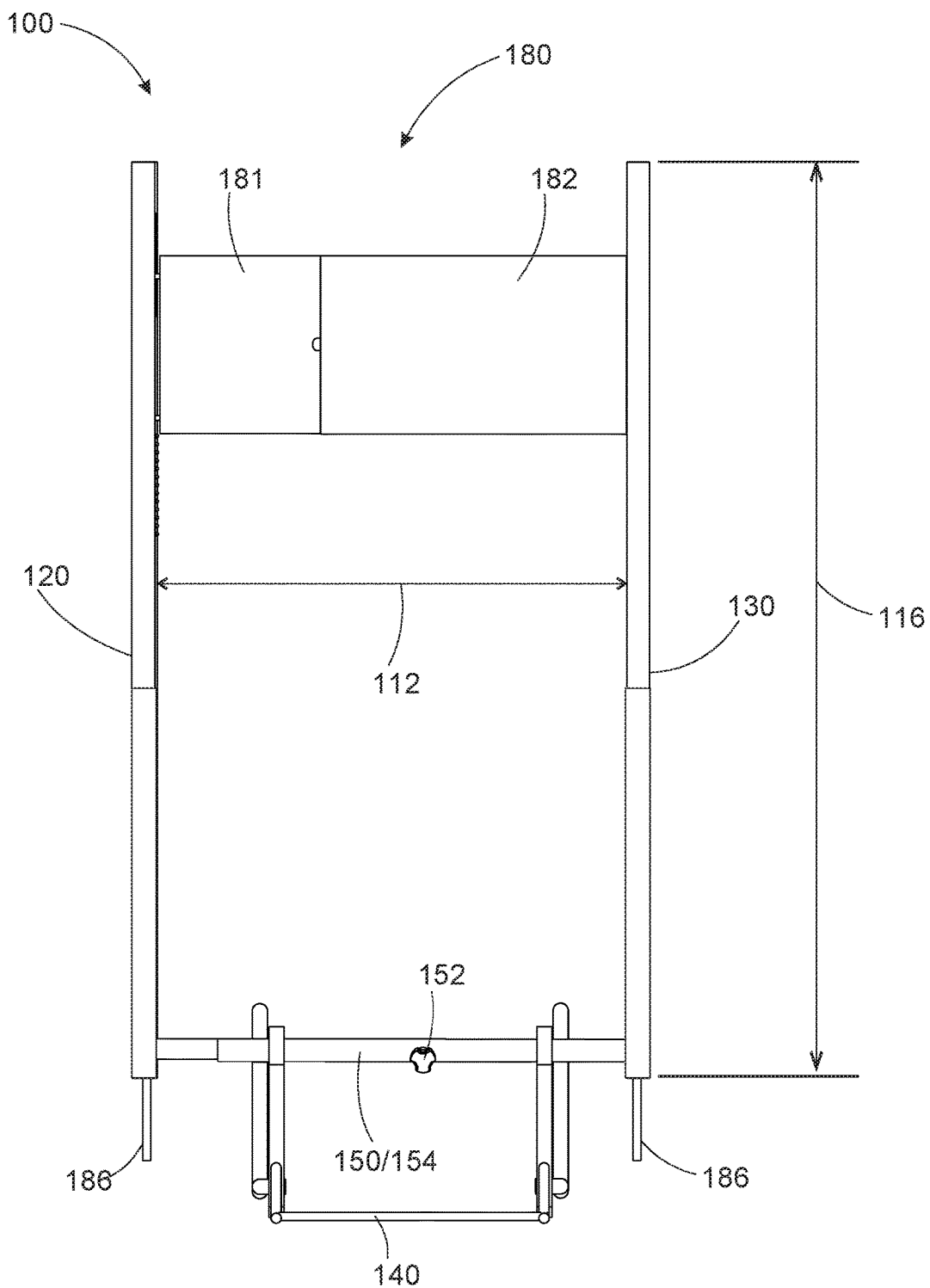
FIG. 8 is a top view of a zoning tool, in accordance with some embodiments.
Figure 9:
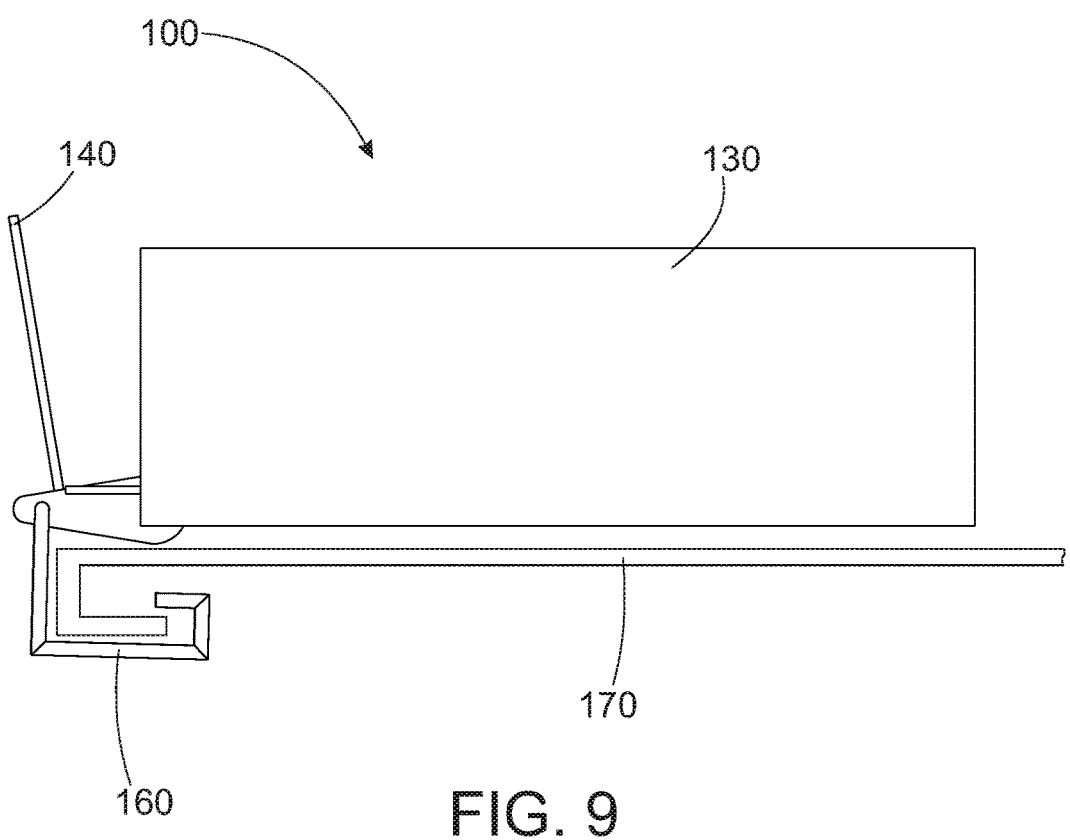
FIG. 9 is a side view of a zoning tool on a shelf, in accordance with some embodiments.

Referring to the drawings, FIG. 5 depicts a method 80 for using a stocking tool according to embodiments. The method 80 may include placing a stocking tool on a shelf at a desired location for a product to be stocked (Step 81); moving a handle of the stocking tool from an unlocked position to a locked position to lock the stocking tool in place on the shelf (Step 82); adjusting a width defined between first and second adjustable rigid side members, wherein the width corresponds to a size and amount of the product to be stocked on the shelf (Step 83); placing the product to be stocked with the tool within the width defined between the first and second adjustable rigid side members (Step 84); moving the handle of the stocking tool from the locked position to the unlocked position (Step 85); and removing the stocking tool from the shelf leaving the product on the shelf (Step 86).

The method 80 may further include retaining the first and second adjustable rigid side members with a selected width defined between the first and second adjustable rigid side members. Retaining the first and second adjustable rigid side members with the selected width defined between the first and second adjustable rigid side members may comprise operating a sizing device.

Step 84 of placing the product to be stocked with the tool may comprise placing the product on the shelf within the width defined between the first and second adjustable rigid side members. Step 82 of moving the handle to of the stocking tool from the unlocked position to the locked position comprises rotating the handle from a position disengaged with the shelf to a position engaged with the shelf. Step 85 of moving the handle to of the stocking tool from the locked position to the unlocked position comprises rotating the handle from the position engaged with the shelf to the position disengaged with the shelf. The method 80 may also include adjusting a length of each of the first and second adjustable rigid side members to substantially equal to a depth of the shelf.

FIGS. 6-9 depict a zoning tool 100 according to embodiments of the present inventive concept. The zoning tool 100 may include a first adjustable rigid side member 120, a second adjustable rigid side member 130 and a handle 140. The zoning tool 100 may also include a sizing device 150, a locking device 160, and a moveable door 180. Each of these components may be assembled to form the zoning tool 100, in accordance with embodiments. Many of these components, such as the first adjustable rigid side member 120, second adjustable rigid side member 130, handle 140, sizing device 150, and locking device 160 may be similar to or the same as comparable components of FIGS. 1-4, and therefore, details of these components are not repeated for brevity.

The first adjustable rigid size member 120 may include a top edge 122, a bottom edge 124, a front edge 126 and a rear edge 128. The first adjustable rigid side member 120 also includes an inner surface 121 and an outer surface 123. The second adjustable rigid size member 130 may include a top edge 132, a bottom edge 134, a front edge 136 and a rear edge 138. The second adjustable rigid side member also includes an inner surface 131 and an outer surface 133. The first adjustable rigid side member 120 and the second adjustable rigid side member 130 may be operatively coupled together wherein the inner surface 121 of the first adjustable rigid side member 120 is facing the inner surface 131 of the second adjustable rigid side member 130. Further, the first and second adjustable rigid side members 120 and 130 are oriented such that the top edge 122, the bottom edge 124, the front edge 126 and the rear edge 128 of the first adjustable rigid side member 120 are respectively aligned and substantially parallel with the top edge 132, the bottom edge 134, the front edge 136 and the rear edge 138 of the second adjustable rigid side member 130. In operation, the bottom edge 124 of first adjustable rigid side member 120 and the bottom edge 134 of the second adjustable rigid side member 130 rest on a shelf 170 (see FIG. 9).

In embodiments, the first adjustable rigid side member 120 operatively coupled to second adjustable rigid side member 130 means that the first adjustable rigid side member 120 and the second adjustable rigid side member 130 are moveable toward and away from each other to adjust a width 112 defined between the inner surface 121 of the first adjustable rigid side member 120 and the inner surface 131 of the second adjustable rigid side member 130. One way that the first adjustable rigid side member 120 is operatively coupled to the second adjustable rigid side member 130 is with the sizing device 150. The sizing device 150 may be coupled between the inner surface 121 and the inner surface 131. In some embodiments, the sizing device 150 may be telescoping rods to linearly adjust the width 112 between the first adjustable rigid side member 120 and the second adjustable rigid side member 130. The sizing device 150 may be located such that it does not interfere with a shelf that the zoning tool 100 will be used with for stocking product 114. The width 112 receives product 114 within the width between the first and second adjustable rigid side members 120 and 130 and rests on the shelf 170 and the first and second adjustable rigid side members 120 and 130 align the product within the zoning tool 100.

The sizing device 150 may also include a locking mechanism 152. The locking mechanism 152 operated to lock the sizing device at a predetermined size to establish the width 112 between the first and second adjustable rigid side members 120 and 130. For example, and without limitation, in the embodiment shown, wherein the sizing device 150 is telescoping rods, the locking mechanism 152 may be a rotatable screw lock to hold the telescoping rods in a fixed position, thereby locking the width 112 at a desired measurement. The width 112 defined between the first and second adjustable rigid side members is maintained through the entire length and height of the first and second adjustable rigid side members 120 and 130.

In embodiments, the first and second adjustable rigid side members 120 and 130 may include a length 116. The length 116 may be adjustable in order to account for different shelf depths. The length 116 may be adjustable in different ways. For example and without limitation, the first and second adjustable rigid side members 120 and 130 may each include two plates that slide next to each other to adjust the length 116, or the first and second adjustable rigid side members 120 and 130 may each include a plate nested within the original side member, wherein the nested plate may slide out of and into the original side member to adjust the length 116 of the first and second adjustable rigid side members 120 and 130.

In embodiments, the handle 140 is operatively coupled to the first adjustable rigid side member 120 and the second adjustable rigid side member 130. The handle 140 is moveable between a locked position with the handle 140 activating the locking device 160 and an unlocked position with the handle 140 deactivating the locking device 160. In some embodiments, the handle 140 is rotatable. In these embodiments, the handle 140 being moveable between the locked position and the unlocked position comprises the handle 140 being rotatable between the locked position with the handle 140 activating the locking device 160 to engage with the shelf 170 and the unlocked position with the handle 140 deactivating the locking device 160 to disengage from the shelf 170. In some embodiments, as shown in the figures, the locking device includes a cam 162 and a locking member 164, wherein the handle 140 rotates about the cam axis and moves the locking member 164 to engage or disengage the shelf 170.

Figure 10A:
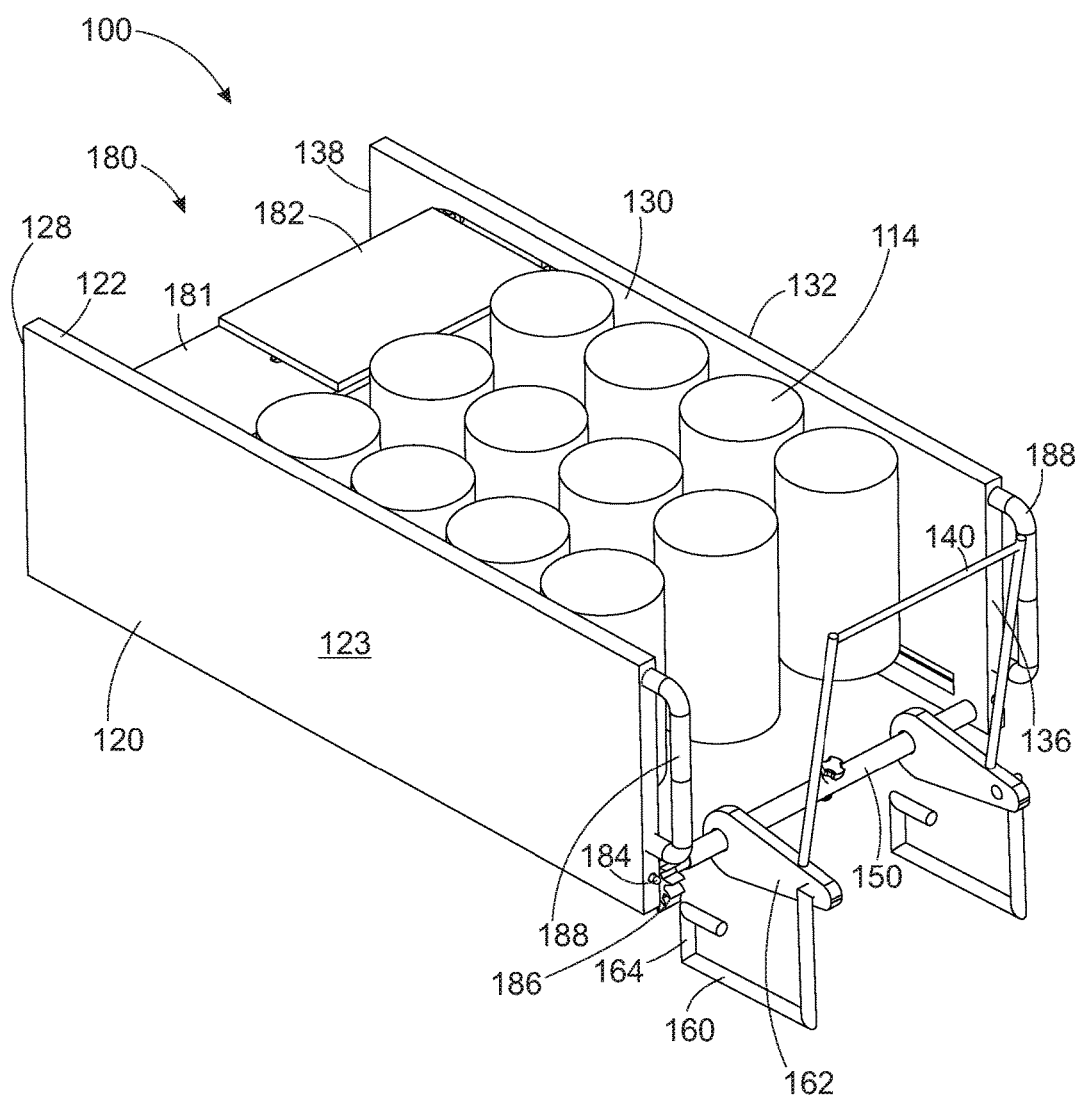
FIG. 10A is a perspective view of a zoning tool with a moveable door in an open position, in accordance with some embodiments.
Figure 10B:
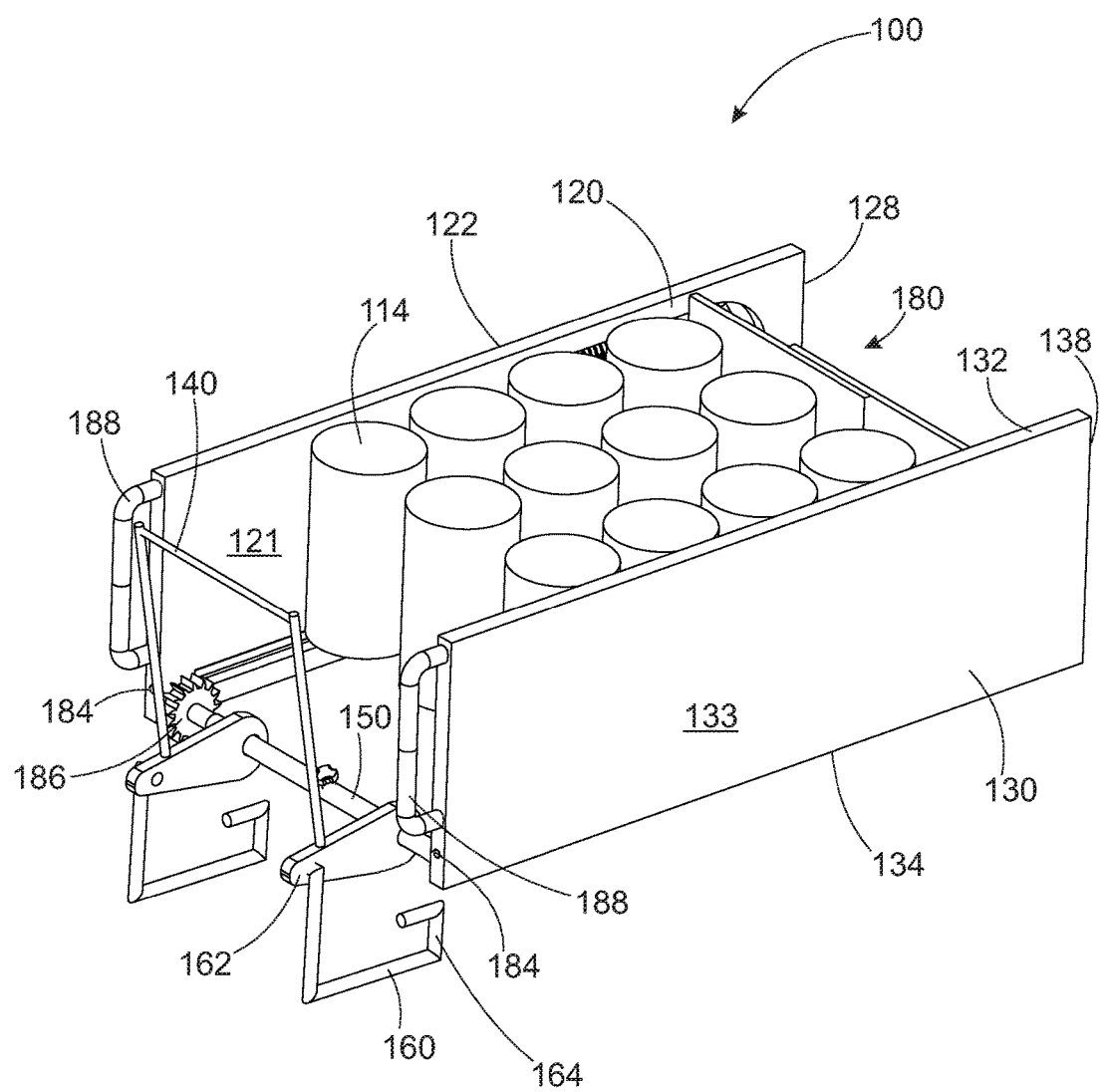
FIG. 10B is a perspective view of a zoning tool with a moveable door in a closed position, in accordance with some embodiments.
Figure 11:
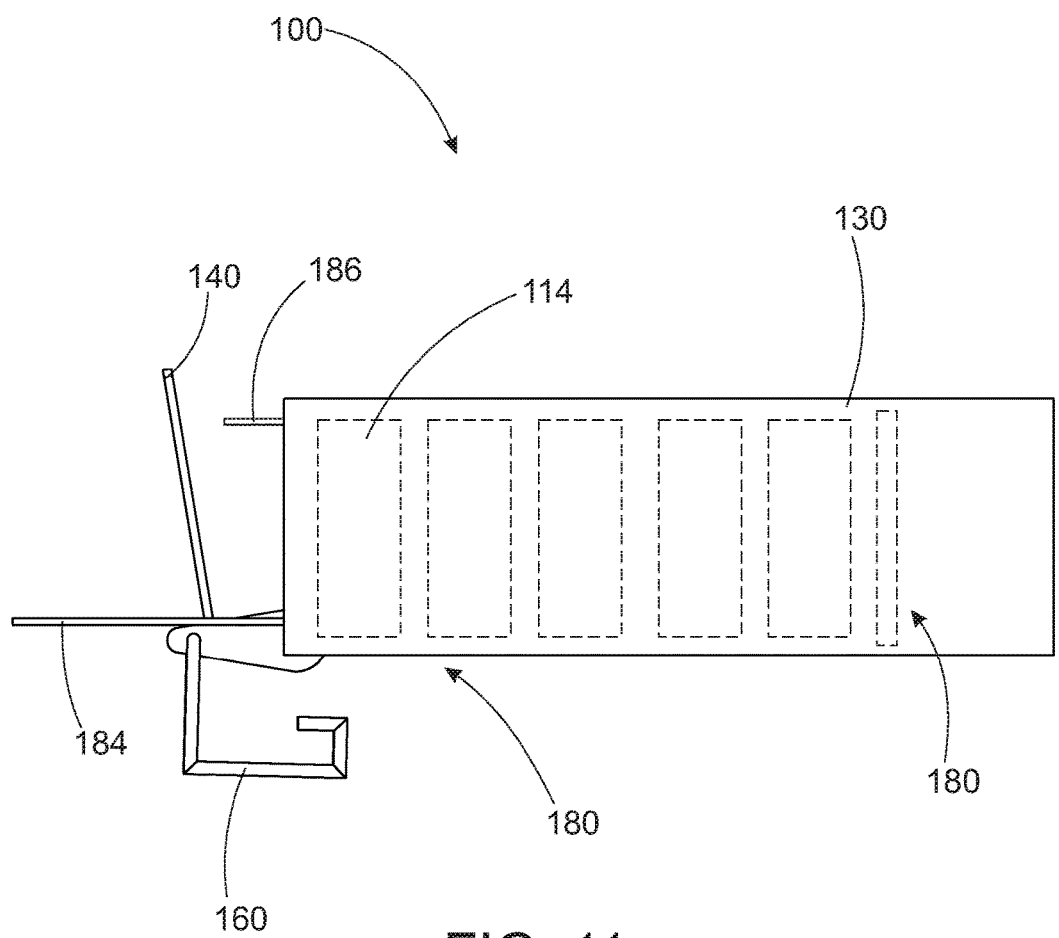
FIG. 11 is a side view of a zoning tool with a moveable door in a closed position and zoning product within the zoning tool, in accordance with some embodiments.

Referring to FIGS. 10A-11, the moveable door 180 may include a first door member 181 and a second door member 182, wherein the first door member 181 is slidably coupled to second door member 182. This allows the moveable door 180 to adjust in width in response to adjustment of the width 12 of the zoning tool 100. The moveable door is hinged on a top side, wherein the top side of the moveable door is coupled adjacent the top edge 128 of the first adjustable rigid side member 120 and adjacent the top edge 138 of the second adjustable rigid side member 130. A bottom side of the moveable door 180 may be coupled on bottom corners to bottom rigid cables 184 extending operably through the first and second adjustable rigid side members 120 and 130. The cables 184 extend through front edges 126 and 136 of the respective first and second adjustable rigid side members 120 and 130. Pulling on bottom rigid cables 184 operate to rotate the moveable door into a closed position and ready to zone product within the zoning tool 10. The bottom rigid cables may be pulled in response to operating the locking device 60, wherein rotation of the handle 40 turns a gear 186 operatively engages the cables 184 to pull the cables 184 that pull from the bottom of the door 180 to move it to the closed position. The top side of the moveable door 180 may be operatively coupled adjacent the top edge 128 of the first adjustable rigid side member 120 and adjacent the top edge 138 of the second adjustable rigid side member 130 with a spring that biases the door 180 toward the opened position. The door 180 is maintained in the same position with respect to the first and second adjustable rigid side members 120 and 130, wherein using handles 188 to pull first and second adjustable rigid side members 120 and 130 forward allows the door 180 in the closed position to move the product forward.

Once the moveable door 180 is rotated into the closed position, the gear 186 would then unpair to leave the locking handle 140. A lock pin operates to keep the door 180 down on the gear 186 attached to the first and second adjustable rigid side members 120 and 130. The the gear 186 is paired again, the cables 184 are released and the spring moves door 180 into the opened position.

Product may be zoned by the moveable door 180 engaging product and moving it toward the front of the shelf. The zoning tool 10 may include a stop 154 coupled to the front edge 126 of the first adjustable rigid side member 120 and the front edge 136 of the second adjustable rigid side member 130. The product within the zoning tool 100 is clamped between the stop 154 and moveable door 180 in response to moving the moveable door 180 linearly along the shelf as a result of the first adjustable rigid side member 120 and the second adjustable rigid side member 120 being pulled with handles 188. In some embodiments, as depicted in the figures, the handle 140 operates as the stop 154.

In some embodiments, a zoning system may include a shelf 170 and a zoning tool 100 as described above. The system allows for zoning of product on the shelf 170 within a defined area on the shelf 170.

Figure 12:
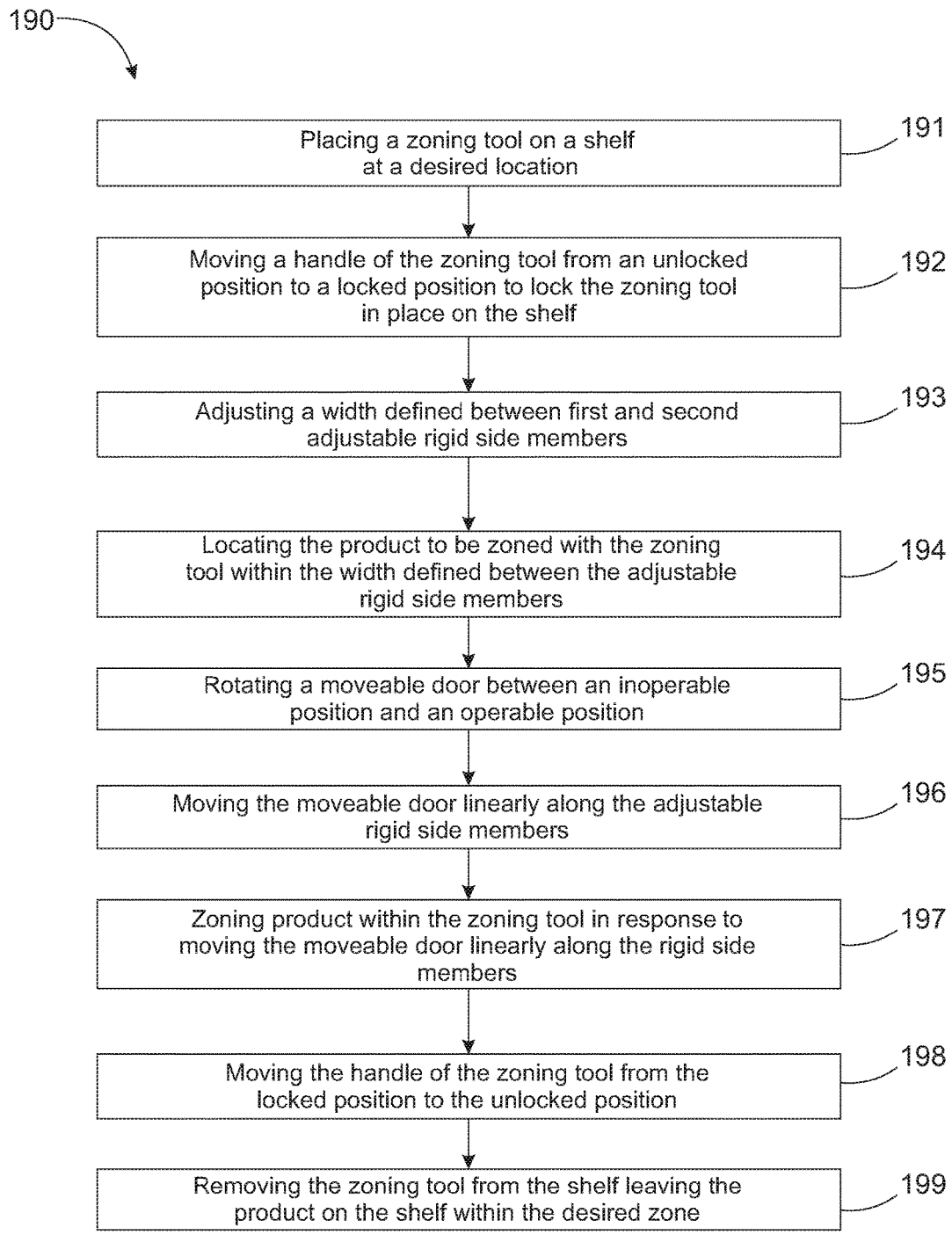
FIG. 12 is a flow diagram illustrating a method using a zoning tool, in accordance with some embodiments.

Referring to the drawings, FIG. 12 depicts a method 190 for using a zoning tool according to embodiments. The method 190 may include placing a zoning tool on a shelf at a desired location for zoning (Step 191); moving a handle of the zoning tool from an unlocked position to a locked position to lock the zoning tool in place on the shelf (Step 192); adjusting a width defined between first and second adjustable rigid side members, wherein the width corresponds to a size and amount of product to be zoned on the shelf (Step 193); locating the product to be zoned with the zoning tool within the width defined between the first and second adjustable rigid side members (Step 194); rotating a moveable door between an inoperable position and an operable position (Step 195); moving the moveable door linearly along the shelf (Step 196); zoning product within the zoning tool in response to moving the moveable door linearly along the shelf (Step 197); moving the handle of the zoning tool from the locked position to the unlocked position (Step 198); and removing the zoning tool from the shelf leaving the product on the shelf within the desired zone without interfering with existing zones on the shelf (Step 199).

The method 190 may further include retaining the first and second adjustable rigid side members apart a selected width defined between the first and second adjustable rigid side members. Retaining the first and second adjustable rigid side members with the selected width defined between the first and second adjustable rigid side members comprises operating a sizing device.

Step 194 of locating product to be zoned within the tool comprises placing zoning tool over the product on the shelf to place product within the width defined between the first and second adjustable rigid side members. Step 192 of moving the handle to of the zoning tool between the unlocked position and the locked position comprises rotating the handle between a position deactivating a locking device to a position disengaged with the shelf and a position activating the locking device to a position engaged with the shelf.

Step 197 of zoning product within the zoning tool comprises clamping product within the zoning tool between a stop of the zoning tool and the moveable door in response to moving the moveable door linearly along the shelf. The method 190 may also include adjusting a length of each of the first and second adjustable rigid side members to substantially equal to a depth of the shelf.

As will be appreciated by one skilled in the art, the components defining any stocking tool may be formed of any of many different types of materials or combinations thereof that can readily be formed into shaped objects provided that the components selected are consistent with the intended operation of a stocking tool. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any stocking tool may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

While the invention has been shown and described with reference to specific preferred embodiments, it should be understood by those skilled in the art that various changes in form and detail may be made therein without departing from the spirit and scope of the invention as defined by the following claims.

What is claimed is:

1. A stocking tool comprising:
a first adjustable rigid side member;
a second adjustable rigid side member; and
a rotatable handle coupled to ends of the first adjustable rigid side member and the second adjustable rigid side member, wherein:
the first adjustable rigid side member and the second adjustable rigid side member move toward and away from each other to adjust a width defined between the first and second adjustable rigid side members;
the rotatable handle is moveable between a locked position with the handle activating a locking device and an unlocked position with the handle deactivating the locking device, which comprises the handle rotatable between the locked position with the handle activating the locking device to engage with a shelf and the unlocked position with the handle deactivating the locking device to disengage from the shelf; and
the width defined between the first and second adjustable rigid side members receives product on the shelf and the first and second adjustable rigid side members align product on the shelf.

2. The stocking tool of claim 1, wherein the first adjustable rigid side member comprises a first side member bottom edge and the second adjustable rigid side member comprises a second side member bottom edge.

3. The stocking tool of claim 1, further comprising a sizing device, wherein the sizing device retains the first and second adjustable rigid side members apart from each other to define the width.

4. The stocking tool of claim 1, wherein the width defined between the first and second adjustable rigid side members is maintained through the entire length and height of the first and second adjustable rigid side members.

5. The stocking tool of claim 1, wherein the first and second adjustable rigid side members each have a length, wherein the length of the first and second adjustable rigid side member is adjustable to operate with varying depth shelves.

6. A stocking system comprising:
a shelf; and
a stocking tool comprising:
a first adjustable rigid side member;
a second adjustable rigid side member; and
a rotatable handle coupled to ends of the first adjustable rigid side member and the second adjustable rigid side member, wherein:
the first adjustable rigid side member and the second adjustable rigid side member move toward and away from each other to adjust a width defined between the first and second adjustable rigid side members;
the rotatable handle is moveable between a locked position with the handle activating a locking device and an unlocked position with the handle deactivating the locking device, which comprises the handle rotatable between the locked position with the handle activating the locking device to engage with the shelf and the unlocked position with the handle deactivating the locking device to disengage from the shelf; and
the width defined between the first and second adjustable rigid side members receives product on the shelf and the first and second adjustable rigid side members align the received product on the shelf.

7. The stocking system of claim 6, wherein the first adjustable rigid side member comprises a first side member bottom edge and the second adjustable rigid side member comprises a second side member bottom edge.

8. The stocking system of claim 6, further comprising a sizing device, wherein the sizing device retains the first and second adjustable rigid side members apart from each other to define the width.

9. The stocking system of claim 6, wherein the width defined between the first and second adjustable rigid side members is maintained through the entire length and height of the first and second adjustable rigid side members.

10. The stocking system of claim 6, wherein the first and second adjustable rigid side members each have a length, wherein the length of the first and second adjustable rigid side member is adjustable to operate with varying depth shelves.

11. A zoning tool comprising:
a first adjustable rigid side member;
a second adjustable rigid side member, wherein the first adjustable rigid side member and the second adjustable rigid side member move toward and away from each other to adjust a width defined between the first and second adjustable rigid side members to set a zone width;
a handle operatively coupled to the first adjustable rigid side member and the second adjustable rigid side member, wherein the handle is moveable between a locked position with the handle activating a locking device and an unlocked position with the handle deactivating the locking device; and
a moveable door rotatable between an inoperable position and an operable position, wherein the moveable door is linearly moveable along a shelf, wherein
product within the zoning tool is moved to the front of the shelf in response to moving the moveable door linearly along the shelf.

12. The zoning tool of claim 11, further comprising a stop coupled to the front end of the first adjustable rigid side member and the front end of the second adjustable rigid side member.

13. The zoning tool of claim 11, further comprising a sizing device, wherein the sizing device retains the first and second adjustable rigid side members apart from each other to define the width.

14. The zoning tool of claim 11, wherein the width defined between the first and second adjustable rigid side members is maintained through the entire length and height of the first and second adjustable rigid side members.

15. The zoning tool of claim 11, wherein the handle is a rotatable handle.

16. The zoning tool of claim 15, wherein the handle moveable between the locked position and the unlocked position comprises the handle rotatable between the locked position with the handle activating the locking device to engage with the shelf and the unlocked position with the handle deactivating the locking device to disengage from the shelf.

17. The zoning tool of claim 11, wherein the first and second adjustable rigid side members each have a length, wherein the length of the first and second adjustable rigid side member is adjustable to operate with varying depth shelves.

* * * * *